United States Patent
Laniado et al.

(10) Patent No.: US 9,090,402 B2
(45) Date of Patent: Jul. 28, 2015

(54) OBLONG LAZY SUSAN

(71) Applicants: Raymond Laniado, Brooklyn, NY (US); Michael Barenboym, Bedford, MA (US)

(72) Inventors: Raymond Laniado, Brooklyn, NY (US); Michael Barenboym, Bedford, MA (US)

(73) Assignee: Raymond Laniado, Brooklyn, NY (US)

(*) Notice: Subject to any disclaimer, the term of this patent is extended or adjusted under 35 U.S.C. 154(b) by 0 days.

(21) Appl. No.: 14/162,349

(22) Filed: Jan. 23, 2014

(65) Prior Publication Data

US 2014/0166446 A1 Jun. 19, 2014

Related U.S. Application Data

(63) Continuation of application No. 13/569,790, filed on Aug. 8, 2012, now Pat. No. 8,668,070.

(60) Provisional application No. 61/522,282, filed on Aug. 11, 2011.

(51) Int. Cl.
| | |
|---|---|
| B65G 15/00 | (2006.01) |
| B66B 21/00 | (2006.01) |
| B65G 15/30 | (2006.01) |
| A47F 10/06 | (2006.01) |

(52) U.S. Cl.
CPC ............... *B65G 15/30* (2013.01); *A47F 10/06* (2013.01)

(58) Field of Classification Search
CPC ........ B66B 23/00; B66B 23/12; B66B 23/14; B66B 23/145; B65G 35/06; B65G 2201/0258; B65G 17/086; B65G 17/066

USPC ................ 198/321, 326, 831, 850–853, 580; 186/38, 42, 43, 45, 46

See application file for complete search history.

(56) References Cited

U.S. PATENT DOCUMENTS

| | | | |
|---|---|---|---|
| 751,681 A | 2/1904 | Philippi | |
| 2,666,519 A | 1/1954 | Boots | |
| 2,737,288 A * | 3/1956 | Boots et al. | 198/834 |
| 3,578,148 A * | 5/1971 | Pinckard | 198/867.14 |
| 3,895,691 A | 7/1975 | Shiraishi | |
| 3,901,355 A | 8/1975 | Shiraishi | |
| 3,926,489 A | 12/1975 | Futch | |
| 4,216,845 A | 8/1980 | Tashman | |
| 4,765,440 A | 8/1988 | Tashman | |
| 5,884,753 A | 3/1999 | Robertson | |
| 6,170,643 B1 | 1/2001 | Shah | |
| 6,935,489 B2 | 8/2005 | Kawasaki | |
| 7,090,069 B2 | 8/2006 | Kawasaki | |
| 7,168,556 B2 | 1/2007 | Spoeler | |
| 7,775,346 B1 | 8/2010 | Taylor | |
| 8,668,070 B2 * | 3/2014 | Laniado et al. | 198/321 |
| 8,851,820 B2 * | 10/2014 | Bonora et al. | 414/331.03 |
| 2004/0124070 A1 | 7/2004 | Okoshi | |
| 2010/0006524 A1 | 1/2010 | Roach | |

* cited by examiner

*Primary Examiner* — James R Bidwell
(74) *Attorney, Agent, or Firm* — Locke Lord LLP

(57) ABSTRACT

A track system comprises a plurality of track components. Each of the plurality of track components has a cross-section comprising an upper section and a lower section, the upper section being wider than the lower section. At least one carrier has a plurality of rolling surfaces having a first and a second rolling surface, which engage opposing sides of at least one of the plurality of track components that correspond to the lower section of the cross-section of the at least one of the plurality of track components.

20 Claims, 6 Drawing Sheets

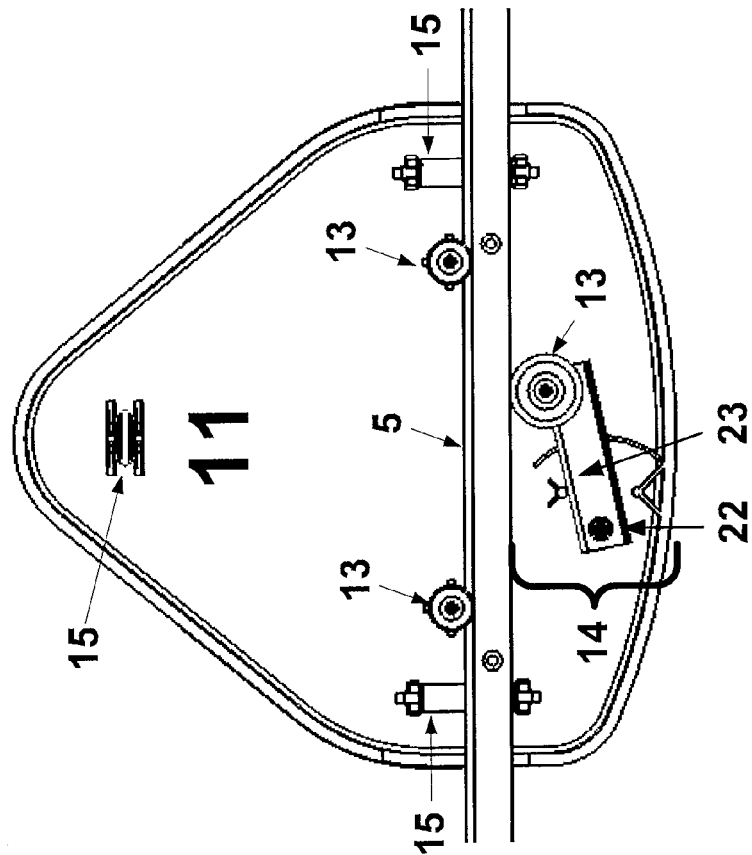
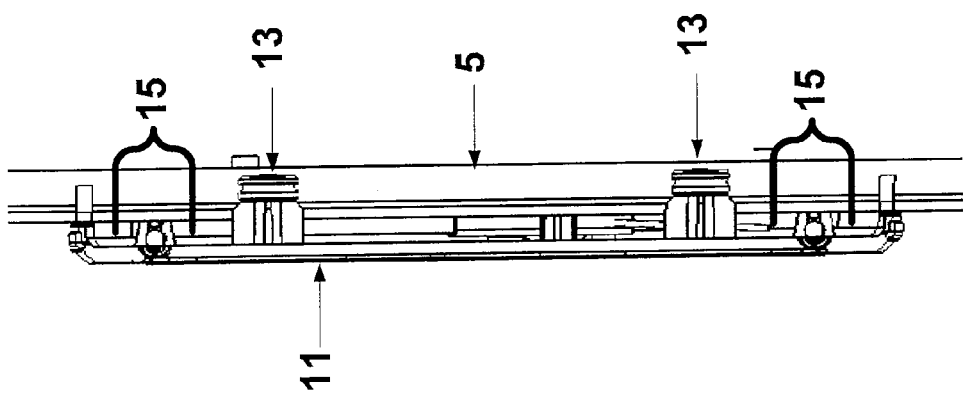

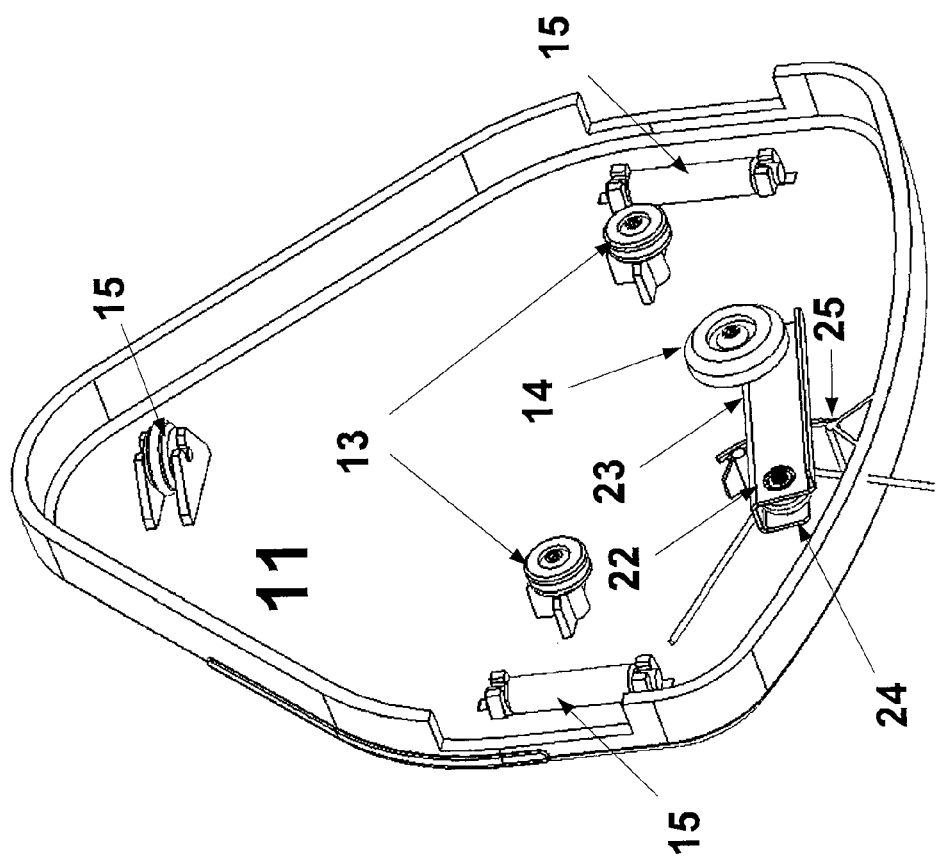

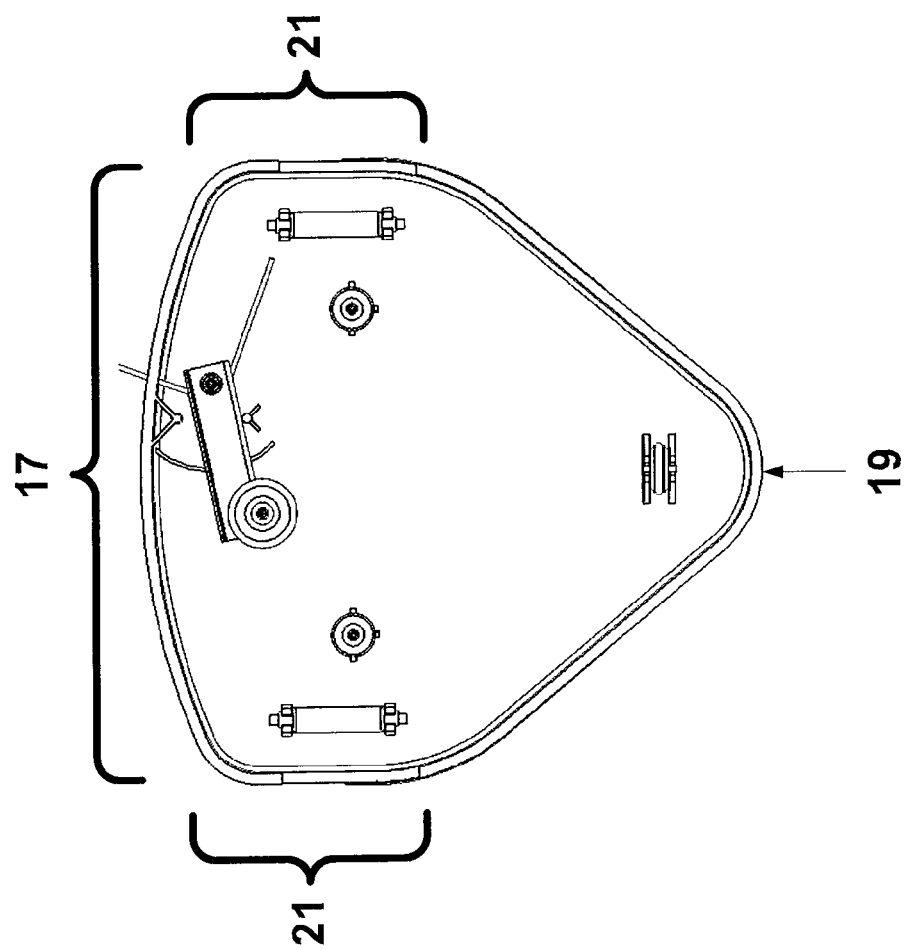

OBLONG LAZY SUSAN

RELATED APPLICATIONS

This application is a continuation of U.S. patent application Ser. No. 13/569,790, filed Aug. 8, 2012, which issued as U.S. Pat. No. 8,668,070, which is a non-provisional application that claims the benefit of priority of U.S. Provisional Patent Application Ser. No 61/522,282, filed Aug. 11, 2011, the disclosures of each of the foregoing applications being incorporated herein by reference in their entirety.

FIELD OF THE INVENTION

This invention relates to service conveyors, for example, service conveyances that present objects along a continuous conveyor in an oblong configuration.

BACKGROUND OF THE INVENTION

A lazy Susan is a device that comprises a rotating platform that allows objects, typically food, to be presented to persons sitting around a round table. The device comprises a turntable supported on bearings. It is also known to provide circular food service conveyors in which a motor driven conveyor belt displays food to customers seated about a non-circular table. For example in U.S. Pat. No. 4,216,845 there is displayed a conveyor belt onto which food containers are attached and the conveyor belt is driven by a motor in a direction so that all the food in the containers is presented to every person seated around the table. The conveyor is also used as an assembly line to allow food trays to be conveniently loaded with various food portions comprising a meal, used for example by airlines, schools and hospitals.

U.S. Pat. No. 3,901,355 disclosed a circulative catering table having inner and outer sidewalls that defined between them an endless circular path of travel. Food was placed in boxes carried by a conveyor belt and presented to persons sitting around the table by a belt driven by a motor in a single direction.

In order to provide a conveyor for an oblong platform, U.S. Patent Application Publication No. 2010/0006524 A1 disclosed a complex combination of circular gears to present the objects in a configuration defined by two large tangential circles.

It is also known to provide moving surfaces in various configurations that provide luggage carousels at airports by using motor driven conveyors consisting of a series of metal plates that move over one another thereby presenting a continuous moving surface transporting the luggage in various serpentine configurations.

What is desired however is a device that can be placed upon an oblong table and used to present food items to persons seated at the table without the need for a driving motor and allowing each person to bring to him or herself objects by simply reaching out and causing the device to move the items in a continuous path passing close to his or her position at the table. In addition to simplicity in motion, the device may be easily taken apart for cleaning and may be lightweight and made of conventional materials.

It may also be desired to mount a device on a surface and be used to present food and other items to persons located in different locations about a room without the need for a driving motor and allowing each person to bring to him or herself the items by simply reaching out and causing the device to move all the items in a continuous path passing close to his or her position at the table.

SUMMARY OF THE INVENTION

A supporting platform has an upper surface, which contains a guidance groove extending in a continuous oblong loop in the upper surface. A plurality of carriers is placed on the supporting platform. The carriers are the surfaces upon which food items may be placed and have rollers extending from the lower surface of the carrier. The rollers are placed in the groove to reduce the friction in moving the carrier around the oblong loop. It is also possible for the groove to have a configuration that captures the rollers. To bear the weight of the carrier and whatever is upon it there may be a plurality of load bearing extensions from the lower surface of the flat carriers.

The flat carrier has a wide end and a narrow end. The narrow end faces into the interior of the loop, and the wide end faces outward from the loop into the exterior of the loop. The flat carrier has sides that are generally perpendicular to the wide end of the carrier, gradually converging to the narrow end of the carrier.

The carriers may be arranged to almost abut, so that when one is pushed along the groove another carrier in the plurality of carriers also will move.

BRIEF DESCRIPTION OF THE DRAWINGS

FIG. 3 is a cross section view of an exemplary roller for use in exemplary embodiments of the present invention.

FIG. 4 is a cross section view of a load bearing extension of an exemplary embodiment of the present invention.

FIG. 5 is a cross section view of a load bearing extension in relation to the rollers of an exemplary embodiment of the present invention.

FIG. 6 is a plan view of a flat carrier of an exemplary embodiment of the present invention.

DETAILED DESCRIPTION OF PREFERRED EMBODIMENTS OF THE INVENTION

Figure 1:
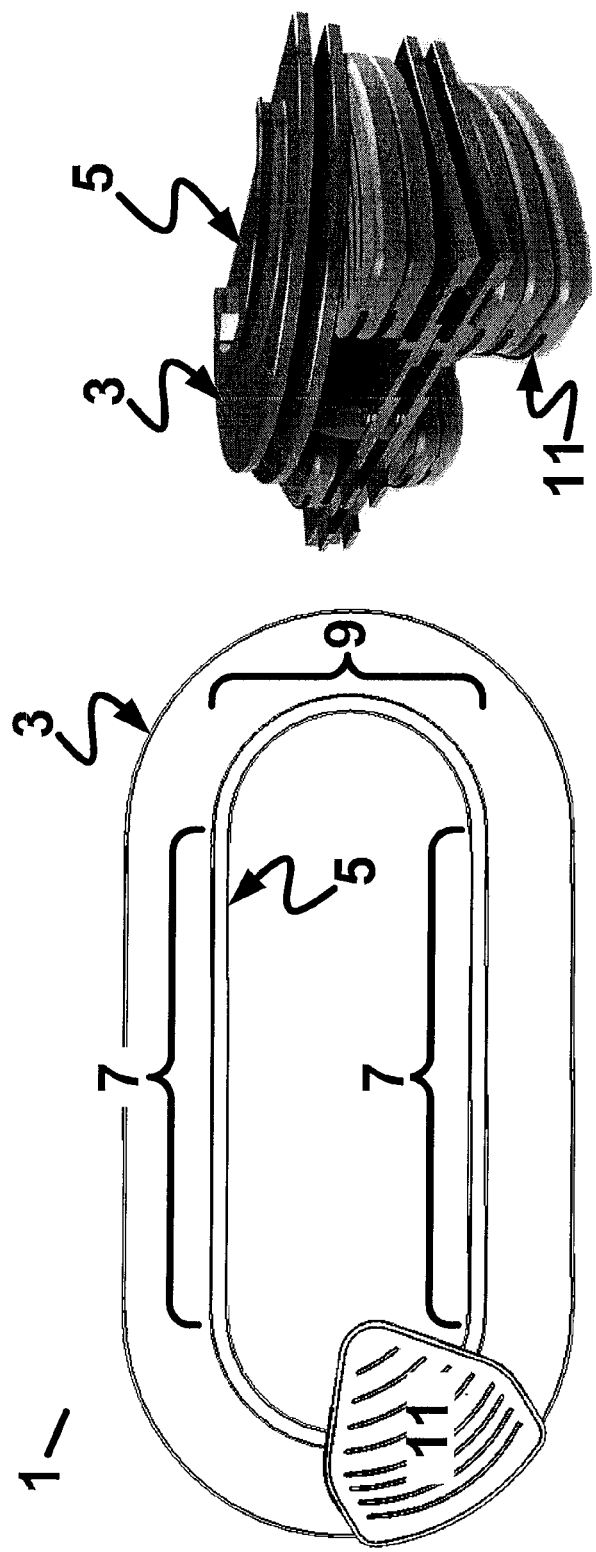
FIG. 1 is a plan view of the supporting platform of an exemplary embodiment of the present invention.

FIGS. 1 through 5 illustrate several exemplary embodiments of the present invention described herein. As shown in FIG. 1, a supporting platform 1 has an upper surface 3 which contains a guidance groove or track 5 having a substantially uniform width and extending in a continuous oblong loop about the upper surface 3. Guidance groove 5 may be a surface below the upper surface 3 into which objects may slide about the platform 1. Alternatively, guidance groove 5 may be a series of tracks extending above surface 3 and providing grooves to accommodate sliding objects. Guidance groove 5 may be made out of the same or different material as platform 1, surface 3 and/or both. An exemplary guidance groove 5 may be a molded portion of platform 1 so as to provide smooth transitional surfaces for objects to slide therein or against. In another exemplary embodiment, groove 5 may contain magnetic strips for magnetic gliding about platform 1. In a preferred embodiment, supporting platform 1 has a flat upper surface 3.

The oblong loop 5 may have substantially straight sides 7 and substantially rounded ends 9 joining the substantially straight sides into a continuous loop. An exemplary oblong loop may comprise a length of straight sides 7 that may be greater than the dimensions of rounded ends 9. It is not required that the sides be perfectly straight or that the ends be portions of a circle. For example, the configuration of an exemplary oblong loop could be an ellipse, or any geometrical shape having a generally oblong character. Alternatively, the loop formed by continuous groove 5 may be formed into a complete circle. Where the ends 9 are not circular, they may nevertheless have a radius of curvature at each point and the generally oblong shape could be achieved by having the sides longer than the average radius of curvature. It is also possible for the ends 9 to be substantially rigid so that the loop 5 takes on the shape of a rectangle with a combination of sides 7 and 9 having substantially different length. Where the loop 5 configuration is substantially rectangular it may be advantageous that its ends 9 have a partial radius for smoothly joining sides 7.

The supporting platform 1 may be made of any suitable material. Platform 1 is preferably made from wood, plastic, or a light metal so that the weight may be kept to a minimum. Preferably, an exemplary supporting platform 1 may weigh only a few pounds fully assembled.

With further reference to FIG. 1, an exemplary platform 1 may be capable of segmentation or separated into pieces for ease of storage or attachment to other platform 1 components. For example, a platform 1 may be divided into a left, right and center section whereby the left and right sections contained the rounded portions of oblong groove 5 and the center section contains the substantially straight portions of oblong groove 5. In this exemplary embodiment, a segmented platform 1 may be taken apart so the individual sections may be stored in a more convenient storage container or packaging. Such a segmentation capability may also allow platform 1 to grow in size, for example by adding an additional center section to further elongate the oblong groove 5. Alternatively, platform 1 may be made smaller to accommodate a smaller service surface by removal of sections. The segments of platform 1 may engage one another by snapping into place, locking, fastening, sliding, magnetic attraction or any other abutment and/or adjoining mechanisms known to those skilled in the art. It is also conceivable that an exemplary continuous groove 5 may have any number of shapes depending on the number of different segments adjoined to a particular platform 1.

Figure 2:
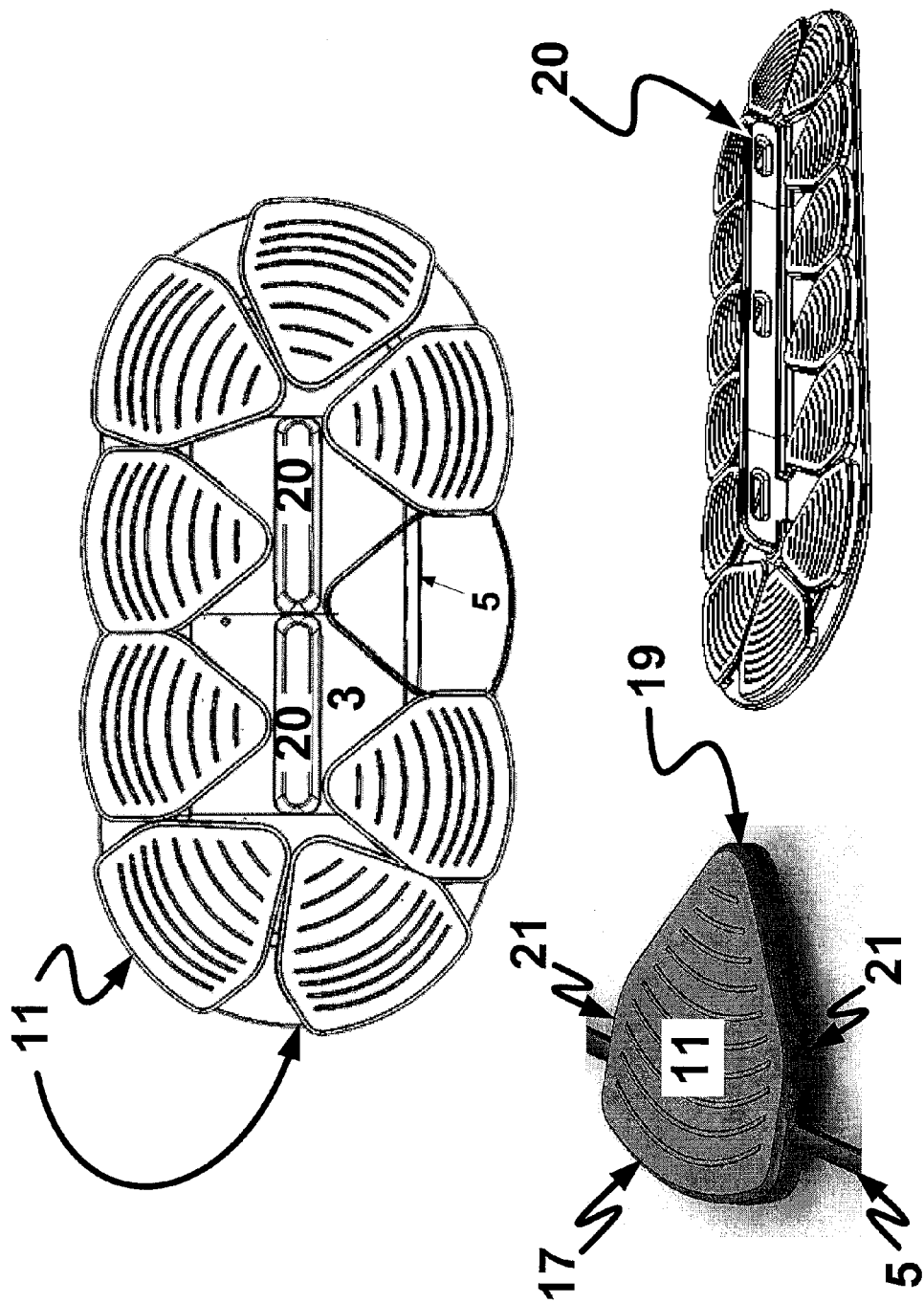
FIG. 2 is a plan view of an exemplary embodiment of the oblong lazy Susan of the present invention.

As shown in FIG. 2, a plurality of carriers 11 may be placed on the supporting platform 1. The carriers are the surfaces upon which food and other items may be placed, either directly or in other repositories such as plates, trays or containers (not shown) which may be capable of attachment to carriers 11. For example, a food-carrying carrier 11 may have space for placement of a food item and a beverage. Alternatively, carrier 11 may have dividers to place different types of foods and/or beverages. Further carriers 11 may be used to hold books, videocassettes, cook ware or other items. An exemplary carrier 11 may not be limited to being flat, but may have any surface (such as, for example, a curved surface, a slotted surface, an indented surface or a combination of these). In a preferred embodiment, an exemplary carrier 11 may substantially maintain the stability of the object placed upon it. Additionally, an optional group of handles 20 may be incorporated into the surface of supporting platform 1 for ease of carrying, moving and/or removing. Preferably, handles 20 may be shaped in any form so as not to interfere with the displacement of carriers 11 about track 5.

An exemplary carrier 11 may comprise a back side 17 facing away from platform 1, abutting sides 21 abutting one or more carriers 11 on track 5 and a narrow end 19 which points inwardly within platform 1. An exemplary carrier 11 may have any number of sides suitable for use in accordance with the disclosures of the present invention. A preferred carrier 11 may be pentagonal with the smallest vertex being narrow end 19, the sides connecting the obtuse angles to the right angles being sides 21 and the end connecting both right angles being back side 17. Alternatively, carrier 11 may be trigonal, octagonal, hexagonal and diamond shaped. Further, according to an exemplary embodiment of the present invention, all carriers on a platform 1 may be similarly shaped. However, carriers 11 may be removable and exchangeable between different platforms 1, thereby allowing for multiple shaped carriers on a single track 5. Thus, an exemplary oblong lazy Susan may contain any number of carriers 11 of any number of sizes and shapes to fit a particular purpose or purposes.

As shown in FIG. 3, a flat carrier 11 may have rollers 13 extending from the lower surface of the carrier 11, that is, the surface facing upper surface 3 of platform 1. The rollers 13 may be placed in a groove within track 5. Use of rollers 13 according to this exemplary embodiment provides a benefit in greatly reducing the friction encountered while moving the carrier around the oblong loop. In a preferred embodiment, in order to fit within a groove in track 5, the rollers 13 should have a diameter no greater than the width of the groove. To provide accurate motion of the carrier, the diameter of a roller 13 should be approximately the same as the width of the groove. In yet another preferred embodiment, there are at least two such rollers 13 for each carrier 11 to maneuver about grooved track 5. It may also be possible for the groove in track 5 to have a configuration that captures the rollers 13, that is, by encapsulating rollers 13 on all sides within a guidance groove surface. According to this embodiment, a portion of groove 5 may allow the rollers 13 to be slipped into position in the groove and engaged so that one or more of the rollers 13 will not slip out.

Figure 3A:
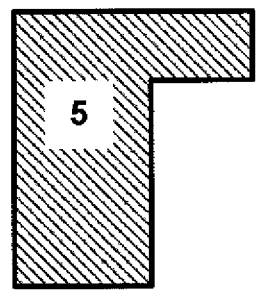
FIGS. 3A-3C are exemplary cross-sections of an exemplary track.
Figure 3B:
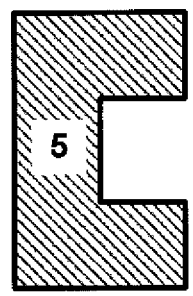
Figure 3C:
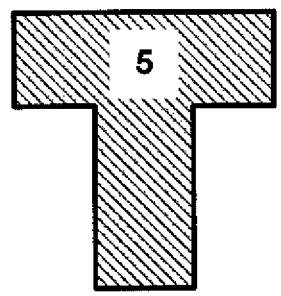

As previously shown and described with respect to FIGS. 1, 3, and 4, track 5 may have a plurality of grooves to accommodate rollers 13, 15, and others with exemplary cross-sections of the types shown in FIGS. 3A-3C. Variations and combinations of these grooves are permissible without departing from the scope and objectives of the present invention.

In an exemplary embodiment according to one aspect of the present invention, the rollers are not preferred to bear the weight of the flat carrier 11 and its contents. According to this exemplary embodiment, there is a plurality of load bearing extensions 15 extending from the lower surface of the carriers 11 as shown in FIGS. 3 and 4. While load bearing extensions 15 may rest upon the non-grooved portion of track 5, as illustrated by the bottom two rollers 15 in FIGS. 3 and 4, load bearing extensions 15 may reside in an alternative groove in track 5 or may be in contact with upper surface 3 of platform 1, as shown by the upper most roller 15 in FIG. 4. While shown as single rollers, load bearing extensions 15 may be any mechanical means to avoid substantial transfer of mechanical loads to rollers 13 and/or track 5. An exemplary load bearing extension 15 may be a roller similar to roller 13 but which rests upon upper surface 3 of platform 1. Alternatively, load bearing extension 15 may be a ball and socket roller, like that found in a computer mouse or the ball point of a ball point pen, which is also in contact with upper surface 3 of platform 1. Load bearing extension 15 may be made of the same or different material as any of the components of an exemplary oblong lazy Susan. Upper surface 3 may have additional tracking, grooves or surface features for receiving load bearing extensions 15 wherever they may be placed about carrier 11 to facilitate operation of the carriers 11 in use of the device.

With further reference to FIG. 4, a spring loaded track roller 14, comprising a roller 13, may be coupled to a groove on track 5 like other rollers 13 present on the underside of carrier 11. Unlike other rollers 13, spring loaded roller 14 utilizes the deformation resiliency of a spring to keep the roller 13 of spring loaded roller 14 in substantially constant contact with track 5 throughout the travel of carrier 11 about upper surface 3. Deformation of the spring in spring roller 14 may keep its roller 13 in contact with a groove of track 5 via an armature 23 connected to a pivot 22. A benefit for spring loaded roller 14 may be to maintain rolling contact with grooves in track 5 in the absence of a radius of curvature about track 5, when sides 9 lack a radius of curvature. Alternatively, spring loaded roller 14 may serve to allow for disengagement of carriers 11 from track 5 for removal from the device, storage, maintenance, replacement or customization. In an exemplary embodiment, pressing a carrier 11 so as to further deflect the spring in a spring loaded carrier 14 may also displace non-spring loaded rollers 13 distally from groove 5 allowing carrier 11 to be lifted off of track 5. While spring loaded roller 14 has been described in terms of a spring and pivotable armature, a coiled spring and armature system may be utilized as well. Alternatively, roller 13 connected only by a spring to a fixed extension on the underside of carrier 11 may also be suitable. Those skilled in the art may recognize various means for using spring engagement of rollers to maintain beneficial contact between carrier 11 and track 5.

While rollers 13 have been described as a means to couple carrier 11 to track 5, rollers 13 may be replaced with magnets with the same polarity as magnet strips within or on track 5. When placed upon magnetic track 5, carrier 11 may be able to float based on the magnetic repulsion of the similarly polarized magnetic strips within or on track 5 and the magnets replacing rollers 13. According to this exemplary embodiment, magnetic repulsion coupling between carrier 11 and track 5 allows for carriers to glide about platform 1 on track 5. While a magnetic gliding array may be used for the purposes of this exemplary embodiment, utilizing a spring loaded roller or magnet may be beneficial to allow similar removal of carrier 11 from track 5. A combination of magnets and rollers may also be utilized in accordance with the various embodiments disclosed herein.

FIG. 5 provides another view of how load bearing extensions 15 are situated with respect to rollers 13 and the lower surface of carrier 11. Also visible is pivot point 22, armature 23 and coil spring 24 of spring loaded roller 14. While spring loaded roller 14 armature 24 may pivot about pivot 22 and an arc track 25, armature 24 may be free to rotate about pivot 22. Where spring loaded roller 14 may be a ball and socket type roller, armature 23 may be a cylindrical arm with spring 24 contained therein. A roller ball (not shown) may be lodged in the cylindrical armature 24 so that a rolling surface stays in contact with a surface of grooved track 5 and the other rolling surface is in contact with spring 24. In this exemplary embodiment, as roller ball responds to movement of carrier 11 about grooved track 5, the rolling contact of roller ball 14 not in contact with grooved track 5 may cause deflections in spring 24 in the cylindrical armature to accommodate the path of carrier 11 about platform 1.

An exemplary carrier 11 is depicted in FIG. 6. As previously described, carrier 11 may have a wide end 17 and a narrow end 19. As shown in FIG. 2, the narrow end 19 faces into the interior of the loop formed by groove 5 and the wide end 17 faces outward from the loop 5. An exemplary carrier 11 has sides 21 that may be generally perpendicular to the wide end 17 of carrier 11, gradually converging to the narrow end 19. The shape of carrier 11 facilitates controlled and smooth motion of adjacent carriers about an oblong circuit which may be defined by grooved track 5. An exemplary carrier has a pentagonal shape, but may be shaped in other ways to effect smooth motion about the oblong circuit or loop defined by groove 5.

Exemplary carriers 11 may be arranged to almost abut when one is pushed along the groove 5 to move the next adjacent carrier 11. In a preferred embodiment, on a standard table surface, the number of carriers 11 may be an odd number so that when one is in the center of a curved end of the loop 5, another carrier 11 is not at the center of the other curved end of the loop. An even number of carriers 11 may also be preferred depending on table size, length of track and geometries of the carriers 11. According to this preferred embodiment, the additional effort to move a carrier around the curve is not the same at both ends simultaneously. Since greater effort may be needed to move a carrier at the distal portions of the loop, the system provides for less expenditure of effort to achieve carrier movement at both ends simultaneously. By shaping the carrier with a narrow end facing inward, the forces needed to move the carriers around the curved end of the oblong loop may be reduced. In general, the carriers move by abutting each other. However, the motion could be accomplished by different means for joining the carriers or spacing the carriers from one another. Such means could include bumpers, chain linkages, magnetic repulsion, or other means of tying or deflecting the carriers to and from each other known to those skilled in the art. An exemplary joining means may be a combination of spring bracket and traction roller. Using a magnetic siding on sides 21 of an exemplary carrier 11, an adjacent carrier with a magnetic siding of like polarity will be deflected away from the first carrier 11, so that when the first carrier is moved, a combination of magnetic force and physical contact will facilitate movement in the next adjacent carrier as well as each additional carrier about the loop.

This present invention disclosure and exemplary embodiments are meant for the purpose of illustration and description. The invention is not intended to be limited to the details shown. Rather, various modifications in the illustrative and descriptive details, and embodiments may be made by someone skilled in the art. These modifications may be made in the details within the scope and range of equivalents of the claims without departing from the scope and spirit of the several interrelated embodiments of the present invention.

What is claimed is:

1. A lazy Susan, comprising:
   a track system comprising a plurality of track components, wherein the plurality of track components comprise a plurality of curved track components interconnected to a plurality of straight track components, wherein each of the plurality of track components has a cross-section comprising an upper section and a lower section, the upper section being wider than the lower section; and
   at least one carrier comprising a plurality of rolling surfaces, wherein the plurality of rolling surfaces are configured to have a first and a second rolling surface engage opposing sides of at least one of the plurality of track components, wherein the opposing sides correspond to the lower section of the cross-section of the at least one of the plurality of track components.

2. The lazy Susan of claim 1, wherein the track system comprises at least two curved track components and at least two straight track components.

3. The lazy Susan of claim 1, wherein the track system is in the shape of an oblong loop.

4. The lazy Susan of claim 1, wherein the at least one carrier does not contact the track system.

5. The at least one carrier of claim 1, further comprising a third rolling surface which engages the at least one of the plurality of track components above the lower section of the cross-section of the at least one of the plurality of track components.

6. The at least one carrier of claim 5, wherein the third one rolling surface and the first and second rolling surfaces are separated.

7. The at least one carrier of claim 6, wherein a portion of the upper section of the cross section of the at least one of the plurality of track components separates the third rolling surface and the first and second rolling surfaces.

8. The at least one carrier of claim 5, wherein the third rolling surface is disposed above the first and second rolling surfaces.

9. The track system of claim 1, wherein the plurality of track components are interconnected by mechanical fasteners.

10. The at least one carrier of claim 1, further comprising an upper surface and an edge extending distally from under the upper surface.

11. The at least one carrier of claim 1, wherein the plurality of rolling surfaces are disposed under the upper surface.

12. The at least one carrier of claim 10, wherein the plurality of rolling surfaces are disposed under the upper surface and beyond the edge.

13. The lazy Susan of claim 1, further comprising at least one carrier having a circular shape.

14. The at least one carrier of claim 13, wherein the at least one carrier is a circle in shape.

15. The lazy Susan of claim 1, further comprising a plurality of carriers having a plurality of shapes.

16. The plurality of shapes of claim 15, wherein at least one of the plurality of shapes is a circular shape.

17. The at least one of the plurality of shapes of claim 16, wherein the circular shape is a circle.

18. The plurality of carriers of claim 15, wherein each carrier in the plurality of carriers is bounded by a uniquely shaped carrier.

19. The plurality of carriers of claim 18, wherein at least one of the carriers in the plurality of carriers is circular in shape and at least one of the carriers in the plurality of carriers is substantially rectilinear in shape.

20. A method of constructing a lazy Susan, comprising the steps of:
assembling a looped track system comprising a plurality of track components, wherein each of the plurality of track components has a cross-section comprising an upper section and a lower section, the upper section being wider than the lower section;
attaching at least one carrier to the looped track system via a plurality of rolling surfaces disposed below the carrier, the plurality of rolling surfaces being configured to have a first and a second rolling surface engage opposing sides of at least one of the plurality of track components;
attaching at least one additional carrier to the looped track system via a plurality of rolling surfaces disposed below the carrier, the plurality of rolling surfaces being configured to have a first and a second rolling surface engage opposing sides of at least one of the plurality of track components;
moving one or more of the at least one carrier and the at least one additional carrier while on the looped track system by moving only one of the at least one carrier and the at least one additional carrier.

* * * * *

UNITED STATES PATENT AND TRADEMARK OFFICE
CERTIFICATE OF CORRECTION

PATENT NO. : 9,090,402 B2  
APPLICATION NO. : 14/162349  
DATED : July 28, 2015  
INVENTOR(S) : Raymond Laniado and Michael Barenboym Page 1 of 1

It is certified that error appears in the above-identified patent and that said Letters Patent is hereby corrected as shown below:

In the Claims:

Claim 2 in Column 6, line 61, please add the word "further" after system;

Claim 6 in Column 7, line 6, please delete "one".

Signed and Sealed this  
First Day of December, 2015

Michelle K. Lee  
*Director of the United States Patent and Trademark Office*